US009626726B2

(12) United States Patent
Thammaiah

(10) Patent No.: US 9,626,726 B2
(45) Date of Patent: Apr. 18, 2017

(54) LOCATION BASED SOCIAL NETWORKING SYSTEM AND METHOD

(71) Applicant: Google Inc., Mountain View, CA (US)

(72) Inventor: Pramod Thammaiah, San Francisco, CA (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/648,719

(22) Filed: Oct. 10, 2012

(65) Prior Publication Data

US 2014/0101246 A1 Apr. 10, 2014

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ......... H04W 4/02; H04W 4/023; H04W 8/08; G06Q 50/01
USPC ....................... 709/204, 205, 206; 445/456.3
See application file for complete search history.

(56) References Cited

U.S. PATENT DOCUMENTS

| | | | | |
|---|---|---|---|---|
| 7,593,740 | B2 | 9/2009 | Crowley et al. | |
| 8,073,467 | B2 * | 12/2011 | Gupta | H04W 4/02 455/414.2 |
| 8,108,414 | B2 * | 1/2012 | Stackpole | 707/758 |
| 2002/0077126 | A1 * | 6/2002 | Pihl et al. | 455/456 |
| 2003/0210142 | A1 * | 11/2003 | Freathy et al. | 340/539.13 |
| 2006/0007039 | A1 * | 1/2006 | Duvall | 342/357.08 |
| 2007/0123215 | A1 | 5/2007 | Wang et al. | |
| 2007/0204804 | A1 * | 9/2007 | Swanson et al. | 119/721 |
| 2009/0088924 | A1 * | 4/2009 | Coffee et al. | 701/33 |
| 2009/0254975 | A1 * | 10/2009 | Turnbull | H04L 63/0492 726/3 |

(Continued)

FOREIGN PATENT DOCUMENTS

| | | |
|---|---|---|
| KR | 10-2006-0097899 | 9/2006 |
| KR | 10-2012-0081448 | 7/2012 |

OTHER PUBLICATIONS

Yu Zheng, Yukun Chen and Wei-Ying Ma, GeoLife2.0: A Location-Based Social Networking Service, May 18-20, 2009, IEEE, Mobile Data Management: SYstems, Services and Middleware, 2009. MDM '09. Tenth International COnference, pp. 357-358.*

(Continued)

*Primary Examiner* — June Sison
*Assistant Examiner* — Dixon Dabipi
(74) *Attorney, Agent, or Firm* — Patent Law Works LLP

(57) ABSTRACT

A method, computer program product, and computer system for receiving, at a first computing device, location information of a second computing device and one or more computing devices. The location information is received in response to an action performed with at least one of the first computing device and the one or more computing devices. At the first computing device, the one or more computing devices that are within a pre-defined distance from the second computing device are identified based upon, at least in part, the location information. At least a portion of automatically-suggested user information associated with the one or more computing devices within the pre-defined distance from the second computing device is sent from the first computing device to the second computing device.

19 Claims, 4 Drawing Sheets

(56) References Cited

U.S. PATENT DOCUMENTS

| | | | | |
|---|---|---|---|---|
| 2011/0289153 | A1 | 11/2011 | Hull et al. | |
| 2011/0307380 | A1* | 12/2011 | Ido | 705/44 |
| 2012/0030227 | A1 | 2/2012 | Mital et al. | |
| 2012/0130823 | A1 | 5/2012 | Levin | |

OTHER PUBLICATIONS

Nan Li and Guanling Chen, Analysis of a Location-Based Social Network, Aug. 29-31, 2009, IEEE, Computational Science and Engineering, 2009. CSE '09. International Conference, vol. 4, pp. 263-270.*

Miltiadis Allamanis, Salvatore Scellato and Cecilia Mascolo, Evolution of a location-based online social network: analysis and models, Oct. 29-30, 2012. ACM, IMC '12 Proceedings of the 2012 ACM conference on Internet measurement conference, pp. 145-158.*

Justin Cranshaw, Eran Toch, Jason Hong, Aniket Kittur and Norman Sadeh, Bridging the gap between physical location and online social networks, Sep. 26-29, 2010. ACM, Ubicomp '10 Proceedings of the 12th ACM international conference on Ubiquitous computing, pp. 119-128.* http://techcrunch.com/2012/06/24/friendshake-facebooks-new-mobile-feature-for-finding-people-nearby-and-a-highlight-killer,
Lunden, Ingrid, Find Friends Nearby: Facebook's New Mobile Feature for Finding People Around You [Updated], Jun. 24, 2012, pp. 1-6.

International Preliminary Report on Patentability for PCT/US2013/064101, mailed on Apr. 23, 2015, 8 pages.

Extended European Search Report for PCT/US2013/064101. mailed on Jan. 27, 2016 8 pages.

* cited by examiner

10

LOCATION BASED SOCIAL NETWORKING SYSTEM AND METHOD

TECHNICAL FIELD

This disclosure relates to location based social networking systems.

BACKGROUND

Online social network websites may provide the ability for users to connect with one another by, e.g., having a first user request to "add" a second user to their social network. For example, the first user may meet the second user at a social event and begin a conversation. During the conversation, the first user may attempt to use a mobile application to connect with the social media website to search for the second user using, e.g., the name of the second user. Once found, the first user may use the mobile application to specifically send a request to have the second user added to the social network of the first user, where the second user may accept or reject the request. However, using the name of the second user may not provide reliable search results, since, e.g., there may be numerous users with the same name that the first user may have to scroll through before finding the second user. Additionally, the name may have been entered incorrectly or the name may simply not appear in the search results. This slows down and may even preclude the ability of the second user to be added the first user's social network.

SUMMARY OF DISCLOSURE

In one implementation, a method, performed by one or more computing devices, comprises receiving, at a web computing device of a social network, location information of a first mobile computing device and one or more mobile computing devices. The location information is received in response to an action performed with at least one of the first mobile computing device and the one or more mobile computing devices. At the web computing device of the social network, the one or more mobile computing devices that are within a pre-defined distance from the first mobile computing device are identified based upon, at least in part, the location information of the first mobile computing device and the one or more mobile computing devices. At least a portion of automatically-suggested user information of the one or more mobile computing devices within the pre-defined distance from the first mobile computing device is sent from the web computing device of the social network to the first mobile computing device based upon, at least in part, the location information of the first mobile computing device and the one or more mobile computing devices.

In one implementation, a method, performed by one or more computing devices, comprises receiving, at a first computing device, location information of a second computing device and one or more computing devices. The location information is received in response to an action performed with at least one of the second computing device and the one or more computing devices. At the first computing device, the one or more computing devices that are within a pre-defined distance from the second computing device are identified based upon, at least in part, the location information. At least a portion of automatically-suggested user information associated with the one or more computing devices within the pre-defined distance from the second computing device is sent from the first computing device to the second computing device.

One or more of the following features may be included. The action performed may include an application opening on at least one of the second computing device and at least one of the one or more computing devices. The action performed may include the second computing device moving relative to at least one of the second computing device and at least one of the one or more computing devices. Sending at least the portion of the automatically-suggested user information may include sending to the second computing device a distance of at least one of the one or more computing devices from the second computing device. Sending at least the portion of the automatically-suggested user information may include organizing, by at least one of the first computing device and the second computing device, at least the portion of the automatically-suggested user information based upon, at least in part, a distance of the one or more computing devices from the second computing device. Receiving the location information may include requesting, by the first computing device, the location information from at least one of the second computing device and at least one of the one or more computing devices after a pre-determined time interval. Receiving the location information may include requesting, by the first computing device, a most recent place of interest within the pre-defined distance of at least one of the second computing device and at least one of the one or more computing devices.

In another implementation, a computer program product resides on a computer readable storage medium that has a plurality of instructions stored on it. When executed by a processor, the instructions cause the processor to perform operations comprising receiving, at a first computing device, location information of a second computing device and one or more computing devices. The location information is received in response to an action performed with at least one of the second computing device and the one or more computing devices. At the first computing device, the one or more computing devices that are within a pre-defined distance from the second computing device are identified based upon, at least in part, the location information. At least a portion of automatically-suggested user information associated with the one or more computing devices within the pre-defined distance from the second computing device is sent from the first computing device to the second computing device.

One or more of the following features may be included. The action performed may include an application opening on at least one of the second computing device and at least one of the one or more computing devices. The action performed may include the second computing device moving relative to at least one of the second computing device and at least one of the one or more computing devices. Sending at least the portion of the automatically-suggested user information may include sending to the second computing device a distance of at least one of the one or more computing devices from the second computing device. Sending at least the portion of the automatically-suggested user information may include organizing, by at least one of the first computing device and the second computing device, at least the portion of the automatically-suggested user information based upon, at least in part, a distance of the one or more computing devices from the second computing device. Receiving the location information may include requesting, by the first computing device, the location information from at least one of the second computing device and at least one of the one or more computing devices after a pre-determined time interval. Receiving the location information may include requesting, by the first computing device, a most recent place of interest within the pre-defined distance of at least one of the second computing device and at least one of the one or more computing devices.

In another implementation, a method, performed by one or more computing devices, comprises transmitting, to a first computing device, location information of a second computing device of a plurality of computing devices, wherein the location information of the second computing device is transmitted by the second computing device in response to an action performed with the second computing device, wherein the first computing device receives location information of a third computing device of the plurality of computing devices, and wherein the first computing device identifies that the third computing device is within a pre-defined distance from the second computing device based upon, at least in part, the location information of the second computing device. The second computing device receives from the first computing device, at least a portion of automatically-suggested user information associated with the third computing device based upon, at least in part, the first computing device identifying that the third computing device is within a pre-defined distance from the second computing device.

One or more of the following features may be included. The action performed may include at least one of: an application opening on at least one of the second computing device and the third computing device, and the second computing device moving relative to at least one of the second computing device and the third computing device. Receiving at least the portion of the automatically-suggested user information may include organizing at least the portion of the automatically-suggested user information based upon, at least in part, a distance of the third computing device from the second computing device. Transmitting the location information of the second computing device may include receiving, from the first computing device, a request to transmit the location information of the second computing device after a pre-determined time interval. Transmitting the location information of the second computing device may include receiving a request, from the first computing device, for a most recent place of interest within the pre-defined distance of at least one of the second computing device and the third computing device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF ONE OR MORE EMBODIMENTS

In some embodiments, a web server may receive location information from one or more mobile computing devices. In some embodiments, the location information may be received in response to an action performed by one or more of the mobile computing devices. Example actions may include shaking the mobile computing device, or making physical contact between the mobile computing device and other mobile computing devices. In some embodiments, the web server may identify the other mobile computing devices that are within a pre-defined distance from each other based upon, at least in part, the received location information. In some embodiments, automatically-suggested user information associated with the one or more mobile computing devices within the pre-defined distance from the other mobile computing devices may be sent from the web server to one or more of the mobile computing devices. The automatically-suggested user information may be used to help add one of the users of the mobile computing devices to a social network of one of the other mobile computing devices.

Figure 1:
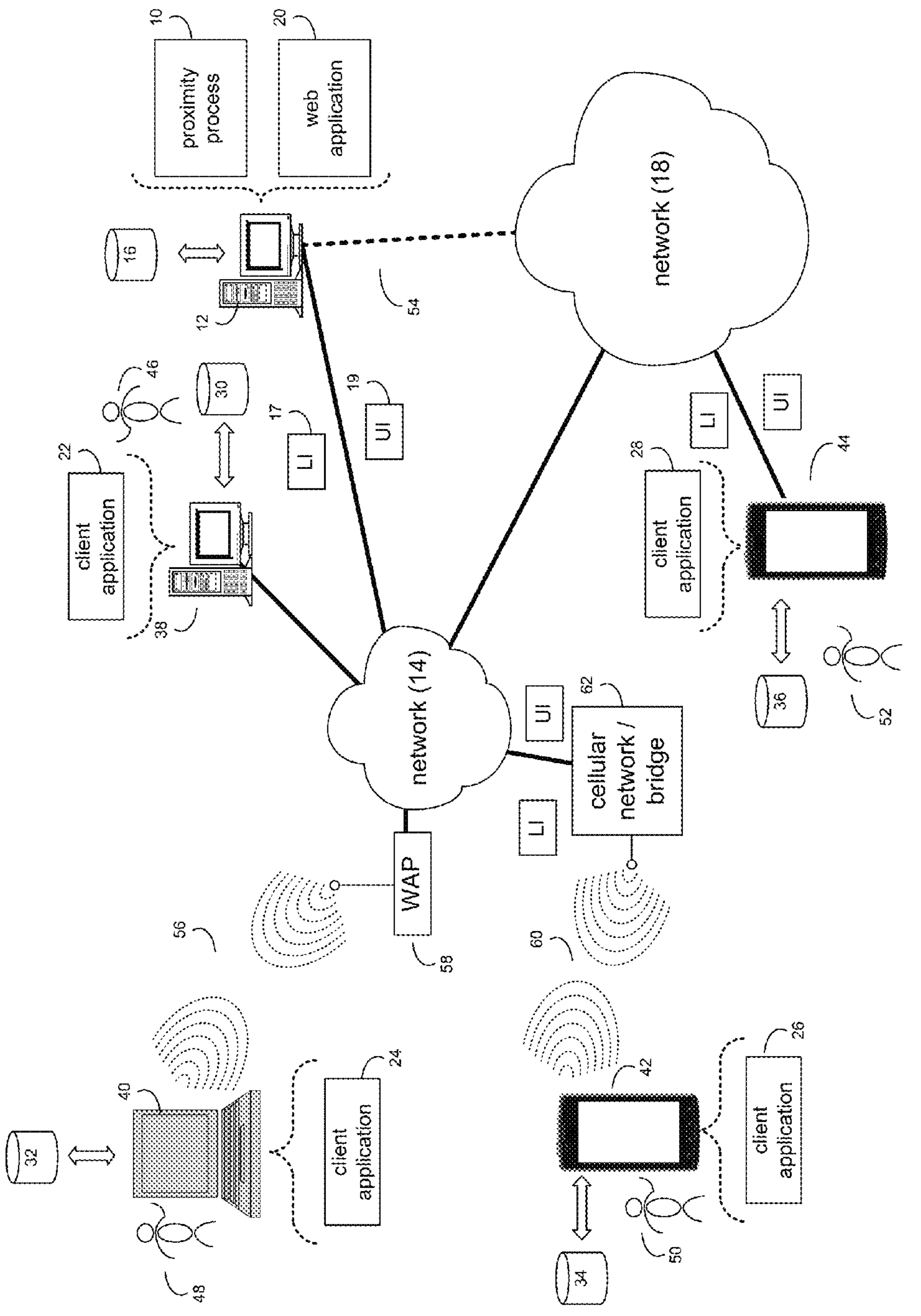
FIG. 1 is an illustrative diagrammatic view of a proximity process coupled to a distributed computing network according to one or more embodiments of the present disclosure.

Referring to FIG. 1, there is shown proximity process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), a mobile computing device(s), a server computer, a series of server computers, a mainframe computer(s), or a computing cloud (s). Computer 12 may execute an operating system, for example, but not limited, to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, proximity process 10 may receive, at a first computing device, location information (e.g., location information 17) of a second computing device and one or more computing devices. The location information may be received in response to an action performed with at least one of the second computing device and the one or more computing devices. At the first computing device, the one or more computing devices that are within a pre-defined distance from the second computing device may be identified based upon, at least in part, the location information. At least a portion of automatically-suggested user information (e.g., user information 19) associated with the one or more computing devices within the pre-defined distance from the second computing device may be sent from the first computing device to the second computing device.

The instruction sets and subroutines of proximity process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store (not shown), such as a database (e.g., relational database, object-oriented database, etc.) and may be located within any suitable memory location, such as storage device 16 coupled to computer 12. The data store may include user information (e.g., profile information) pertaining to a web site, e.g., social networking website). In some embodiments, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Proximity process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a web application (e.g., web application 20), examples of which may include, but are not limited to, e.g., a social networking web application, mobile web application, or custom application. Proximity process 10 and/or web application 20 may be accessed via client applications 22, 24, 26, 28. Proximity process 10 may be a standalone application, or may be an applet/application/script that may interact with and/or be executed within web application 20. Examples of client applications 22, 24, 26, 28 may include but are not limited to a social networking application, mobile social networking application, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop and/or notebook computer (e.g., client electronic device 40), a smart phone (e.g., client electronic devices 42 and 44), a tablet (not shown), a server (not shown), a data-enabled cellular telephone (not shown), a television (not shown), a smart television (not shown), and a dedicated network device (not shown). Client electronic devices 38, 40, 42, 44 may each execute an operating system, examples of which may include but are not limited to Android™, Apple® iOS®, Mac® OS X®; Red Hat® Linux®, or a custom operating system.

One or more of client applications 22, 24, 26, 28 may be configured to effectuate some or all of the functionality of proximity process 10 (and vice versa). Accordingly, proximity process 10 may be a purely server-side application, a purely client-side application, or a hybrid server-side/client-side application that is cooperatively executed by one or more of client applications 22, 24, 26, 28 and proximity process 10.

One or more of client applications 22, 24, 26, 28 may be configured to effectuate some or all of the functionality of web application 20 (and vice versa). Accordingly, web application 20 may be a purely server-side application, a purely client-side application, or a hybrid server-side/client-side application that is cooperatively executed by one or more of client applications 22, 24, 26, 28 and web application 20.

Users 46, 48, 50, 52 may access computer 12 and proximity process 10 directly through network 14 or through secondary network 18. Further, computer 12 may be connected to network 14 through secondary network 18, as illustrated with phantom link line 54. Proximity process 10 may include one or more user interfaces, such as browsers and textual or graphical user interfaces, through which users 46, 48, 50, 52 may access proximity process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Figure 2:
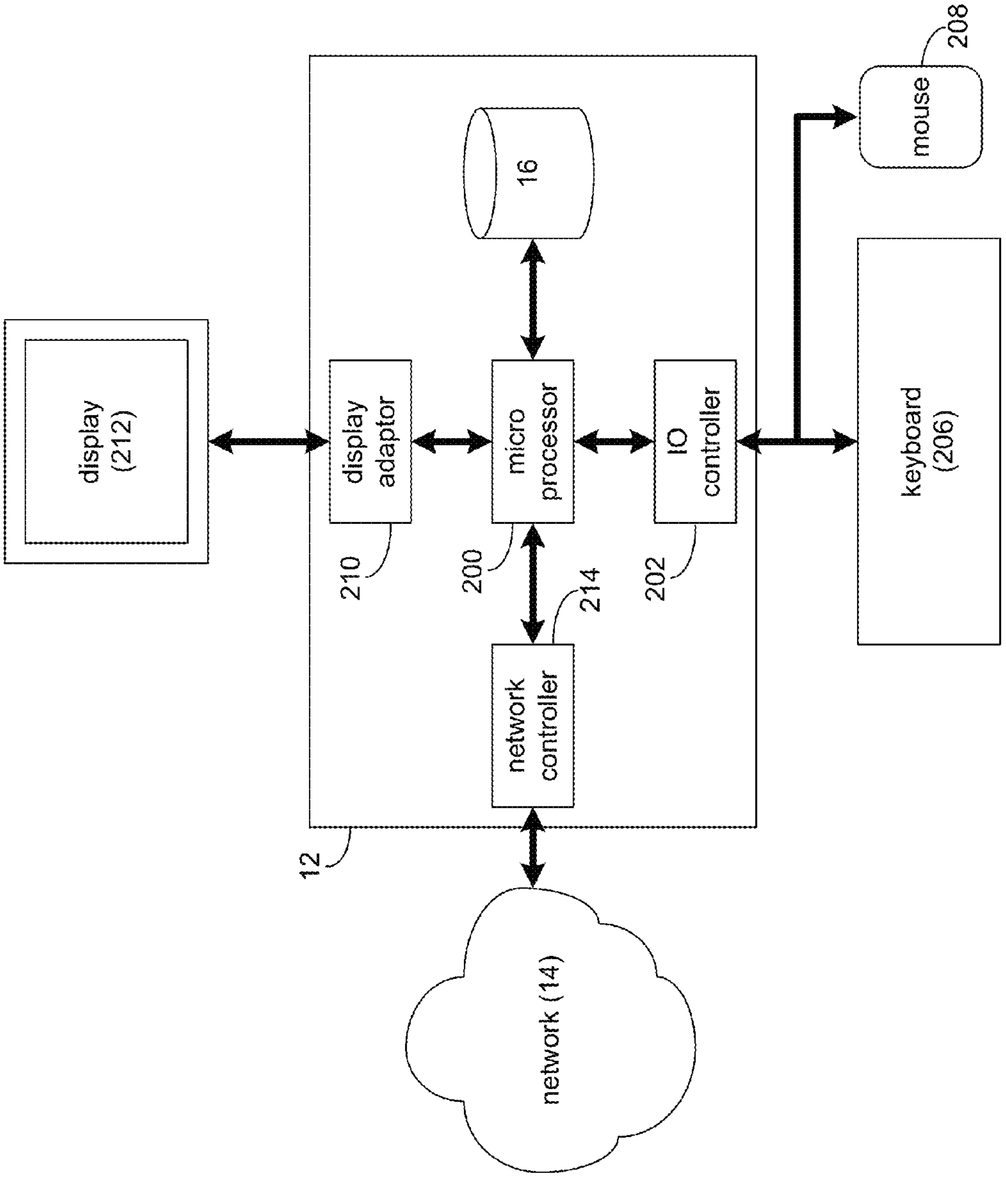
FIG. 2 is a diagrammatic view of the computer of FIG. 1 according to one or more embodiments of the present disclosure.

Referring also to FIG. 2, there is shown a diagrammatic view of computer 12. While computer 12 is shown in this figure, this is for illustrative purposes only and is not intended to be a limitation of this disclosure, as other configuration are possible. For example, any computing device capable of executing, in whole or in part, proximity process 10 may be substituted for computer 12 within FIG. 2, examples of which may include but are not limited to client electronic devices 38, 40, 42, 44.

Computer 12 may include a processor and/or microprocessor (e.g., microprocessor 200) configured to, e.g., process data and execute the above-noted code/instruction sets and subroutines of proximity process 10. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/ selecting device (e.g., mouse 208), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
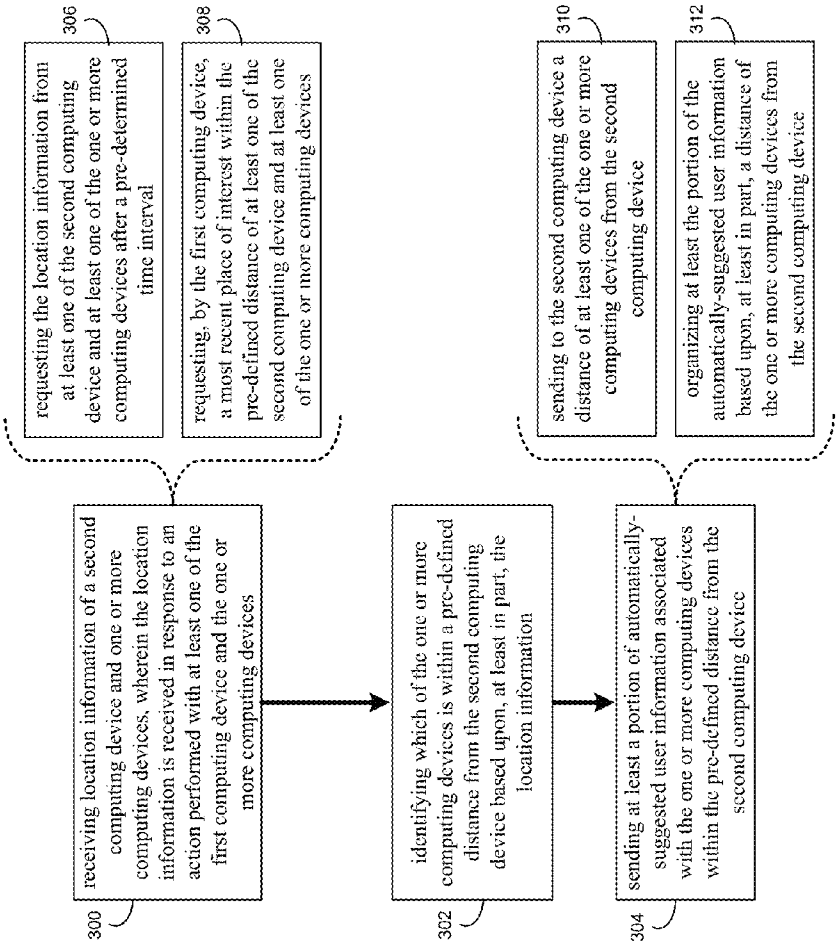
FIG. 3 is an illustrative flowchart of the proximity process of FIG. 1 according to one or more embodiments of the present disclosure.
Figure 4:
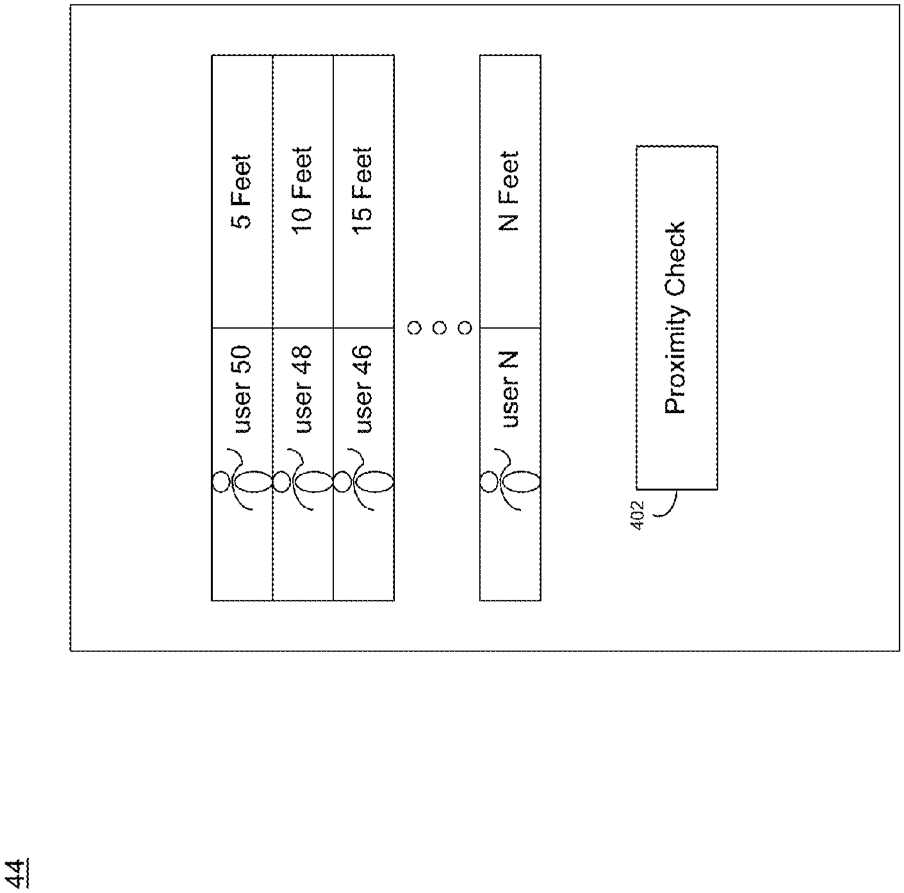
FIG. 4 is an illustrative diagrammatic view of a screen image displayed by the proximity process of FIG. 1 according to one or more embodiments of the present disclosure.

As discussed above and referring also to FIGS. 3-4, proximity process 10 may receive 300, at a first computing device, location information of a second computing device and one or more (other) computing devices. The location information may be received 300 by proximity process 10 in response to an action performed with at least one of the second computing device and the one or more computing devices. At the first computing device, the one or more computing devices that are within a pre-defined distance from the second computing device may be identified 302 by proximity process 10 based upon, at least in part, the received location information. At least a portion of automatically-suggested user information associated with the one or more computing devices within the pre-defined distance from the second computing device may be sent 304 by proximity process 10 from the first computing device to the second computing device.

For instance, assume for example purposes only that user 50 and user 52 meet at a business event in South Boston, Mass. In the example, user 52 decides that s/he would like to add user 50 to her/his social network. Generally, if user 52 decides to accomplish this task on client electronic device 44, it may require that user 52, e.g., open client application 28 (e.g., mobile social network application), navigate to a user searching option in a user interface of client application 28, correctly enter the name of user 50 in the user searching option, instruct client application 20 to query, e.g., web application 20, for the name of user 50, wait for web application 20 to return the results to client application 28, sift through all the returned search results in the hopes that user 50 is one of the returned results, and then select user 50 to have a request sent to add user 50 to the social network of user 52.

However, in some embodiments, the location of users 50 and/or 52 may also be used to make the process of adding user 50 to the social network of user 52 easier and more reliable. For instance, and continuing with the above example where user 52 decides that s/he would like to add user 50 to her/his social network, proximity process 10 may receive 300, e.g., at a first computing device (e.g., computer 12), location information of a second computing device (e.g., client electronic device 44) and/or one or more (other) computing devices (e.g., client electronic device 42). The location information may be determined using, e.g., well known global positioning system (GPS) technology within either client electronic device 44 and/or client electronic device 42.

In some embodiments, the location information (e.g., location information 17) may be sent from either client electronic device 44 and/or client electronic device 42 and received 300 by proximity process 10 at computer 12 in response to, e.g., an action performed with either client electronic device 44 and/or client electronic device 42. The action performed may include, e.g., an application (e.g., client application 28) opening on client electronic device 44 and/or an application (e.g., client application 26) opening on client electronic device 42. For example, to add user 50 to her/his social network, either user 50 and/or user 52 may provide some form of user input to their respective client electronic devices to open the mobile social network client application for execution on their client electronic devices. For instance, in response to mobile social network client application 28 being opened, client electronic device 44 may send location information 17 to be received 300 by proximity process 10 at computer 12. Similarly, in response to mobile social network client application 26 being opened, client electronic device 42 may send the location information to be received 300 by proximity process 10 at computer 12. In some embodiments, user 50 may adjust privacy settings to opt-out of mobile social networking client application 26 sending location information to proximity process 10.

In some embodiments, the action performed may include, e.g., client electronic device 44 moving relative to client electronic device 44 and/or client electronic device 42. For example, user 52 may shake or otherwise move client electronic device 44. The shaking movement may be identified by, e.g., an accelerometer (not shown), a Near Field Communications (NFC) circuit (not shown), etc., within client electronic device 44. For instance, in response to shaking client electronic device 44, client electronic device 44 may send location information 17 to be received 300 by proximity process 10 at computer 12. Similarly, in response to shaking client electronic device 42, client electronic device 42 may send the location information to be received 300 by proximity process 10 at computer 12.

Additionally/alternatively, user 52 may permit client electronic device 44 to come within a predefined distance of client electronic device 42, such that each client electronic device comes into contact (or nearly comes into contact) with the other. For instance, the two client electronic devices may be hit together, which may be identified by, e.g., an accelerometer (not shown), a (NFC) circuit (not shown), etc., within client electronic device 44 and 42 respectively. In the example, in response to moving client electronic device 44 within a predefined distance of client electronic device 44, client electronic device 44 and/or client electronic device 42 may send their respective location information to be received 300 by proximity process 10 at computer 12.

In some embodiments, proximity process 10 receiving 300 location information 17 may include requesting 306, e.g., by proximity process 10 of computer 12, location information 17 from either client electronic device 44 and/or client electronic device 42 after a pre-determined time interval. In some embodiments, the above-noted action performed with either client electronic device 44 and/or client electronic device 42 may include client electronic device 44 and/or client electronic device 42 responding to the request. For example, proximity process 10 may passively gather location information 17 from either client electronic device 44 and/or client electronic device 42 every, e.g., 15 minutes. In the example, after 15 minutes, proximity process 10 may send a request to have either client electronic device 44 and/or client electronic device 42 perform the action of sending proximity process 10 their location information. Proximity process 10 may use the location information received 300 from the request as valid until the next 15 minute interval, where proximity process 10 may consider the previous location information received 300 more than 15 minutes ago as stale. Additionally/alternatively, client electronic device 44 may send location information 17 to be received by proximity process 10 after the pre-determined time interval without receiving a request from proximity process 10 to do so.

In some embodiments, proximity process 10 receiving 300 location information 17 may include requesting 308, e.g., by proximity process 10 of computer 12, a most recent place of interest within the pre-defined distance of either client electronic device 44 and/or client electronic device 42. In some embodiments, the above noted action performed with either client electronic device 44 and/or client electronic device 42 may include client electronic device 44 and/or client electronic device 42 responding to the request. For instance, assume for example purposes only that client electronic device 44 is at establishment Y. In the example, proximity process 10 may send a request to have either client electronic device 44 and/or client electronic device 42 perform the action of sending their location information indicative of being at establishment Y. Proximity process 10 may receive 306 location information 17 that indicates client electronic device 44 (and thus user 52) and/or client electronic device 42 (and thus user 50) are at establishment Y using any of the above-noted techniques. Additionally/alternatively, client electronic device 44 may passively (or by input received from user 52) transmit to, e.g., web application 20, that client electronic device 44 is at (or near) establishment Y. In this example, proximity process 10 may request 308 the transmitted location information 17 from web application 20.

Based upon, at least in part, location information 17, proximity process 10 may identify 302 that client electronic device 42 is within a pre-defined distance from client electronic device 44. For example, proximity process 10 may identify 302 that client electronic device 42 is within a pre-defined distance from client electronic device 44 if the received 300 location information 17 of client electronic device 44 and the received 300 location information 17 of client electronic device 44 indicate that they are within, e.g., 15 feet of one another. Additionally/alternatively, proximity process 10 may identify 302 that client electronic device 42 is within a pre-defined distance from client electronic device 44 if the received 300 location information 17 of client electronic device 44 and the received 300 location information 17 of client electronic device 44 indicate that they are within, e.g., the same establishment Y.

Additionally/alternatively, proximity process 10 may receive 300 location information 17 that indicates that client electronic device 42 has been at establishment Y within a predetermined amount of time (e.g., 5 minutes) from when client electronic device 44 is/has been at establishment Y. For example, proximity process 10 may identify 302 that client electronic device 42 is within a pre-defined distance from client electronic device 44 even if client electronic device 44 and client electronic device 42 are not simultaneously at establishment Y, but both client electronic device 44 and client electronic device 42 were at establishment Y within 5 minutes of each other.

In some embodiments, proximity process 10 may determine which location information to use to identify 302 that client electronic device 42 is within the pre-defined distance from client electronic device 44. For example, continuing with the above example where proximity process 10 may consider location information received 300 more than 15 minutes ago as stale, assume that user 52 has performed the action of opening mobile social networking client application 28 via client electronic device 44 to add user 50 to her/his social network, but that mobile social networking client application 28 does not send location information to proximity process 10. Further assume that proximity process 10 has received 300 the most recent location information from client electronic device 44 5 minutes ago. In some embodiments, proximity process 10 may determine that the location information is valid and may be used to identify 302 client electronic devices within the predetermined distance from client electronic device 44. Conversely, now assume that proximity process 10 has received 300 the most recent location information from client electronic device 44 more than 15 minutes ago. In some embodiments, proximity process 10 may determine that the most recent location information is stale and may not be used to identify 302 client electronic devices within the predetermined distance from client electronic device 44. In the example, proximity process 10 may then request 306/308 updated location information to identify 302 client electronic devices within the predetermined distance from client electronic device 44. Additionally/alternatively, proximity process 10 may use stale location information if, e.g., updated location information is not available or would take too long to receive 300.

Proximity process 10 may send 304 at least a portion of automatically-suggested user information associated with the other client electronic devices within the pre-defined distance from client electronic device 44. For example, assume that user 52 has opened up the mobile social networking client application 28 via client electronic device 44 to add user 50 to her/his social network. Further assume that proximity process 10 has used the received 300 location information 17 to identify 302 that client electronic device 42 is within, e.g., 15 feet of client electronic device 44, or that client electronic device 42 and client electronic device 44 are at establishment Y. In response, proximity process 10 may send 304 to client electronic device 44 automatically-suggested user information (e.g., automatically-suggested user information 19) pertaining to user 50 of client electronic device 42.

In some embodiments, automatically-suggested user information 19 sent 304 to client electronic device 44 may include, for example, sending 310 a distance of client electronic device 42 from client electronic device 44, the name of user 50, a picture or other media of user 50, at least a portion of a profile of user 50 (e.g., a snippet), a time when/since user 50 was at establishment Y, or other user information. Conversely, in some embodiments, proximity process 10 may not send to client electronic device 44 automatically-suggested user information 19 pertaining to user 50 of client electronic device 42 if proximity process 10 has used the received 300 location information 17 to identify 302 that client electronic device 42 is not within, e.g., 15 feet of client electronic device 44, or not at establishment Y within a predetermined amount of time from when client electronic device 44 is at establishment Y as discussed above.

In some embodiments, sending 304 the automatically-suggested user information 19 may include proximity process 10 organizing 312 at least the portion of the automatically-suggested user information 19 based upon, at least in part, a distance of a distance of client electronic device 42 from client electronic device 44. For example, client electronic device 44 may include a display 400. Proximity process 10 (e.g., via web application 20, client application 28, or combination thereof) may organize 312 and/or render each identified 302 user of the client electronic devices that are within the pre-defined distance from client electronic device 44 based on their distance from client electronic device 44 in, e.g., descending order. For example, proximity process 10 may organize 312 automatically-suggested user information 19 such that client application 28 renders user 50 first with a distance of 5 feet from client electronic device 44, renders user 48 second with a distance of 10 feet from client electronic device 44, and renders user 46 third with a distance of 15 feet from client electronic device 44. In some embodiments, proximity process 10 (e.g., via web application 20, client application 28, or combination thereof) may organize 312 and/or render each identified 302 user of the client electronic devices that are within the pre-defined distance from client electronic device 44 based on their distance from client electronic device 44 in, e.g., ascending order. In some embodiments, the organization 312 may be random. Those skilled in the art will appreciate that automatically-suggested user information 19 may be organized 312 by proximity process 10 before being sent 304 to client electronic device 44 or organized at client electronic device 44 by mobile social networking client application 28.

Additionally/alternatively, previously sent 304 automatically-suggested user information 19 may be cached at client electronic device 44 such that mobile social networking client application 28 may organize and/or render automatically-suggested user information 19 without a separate requirement for mobile social networking client application 28 to send a request for updated automatically-suggested user information 19. In some embodiments, whether or not this occurs may depend upon the above-noted validity of the most recent location information 17 received 300 by proximity process 10. Additionally/alternatively, rather than proximity process 10 sending 304 automatically-suggested user information 19 to client electronic device 44, proximity process 10 may send 304 a message to client electronic device 44 with the instructions that updated automatically-suggested user information 19 is unavailable and/or that mobile social networking client application 28 should use the previously cached automatically-suggested user information 19.

In some embodiments, "automatically-suggested" user information 19 may be sent 304 by proximity process 10 at any time after the corresponding client electronic devices have been identified 302, examples of which have been provided above. Additionally/alternatively, "automatically-suggested" user information 19 may be sent 304 by proximity process 10 in response to client electronic device 44 receiving an input (e.g., proximity check 402) from, e.g., user 52.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium can be a non-transitory memory that stores data for providing functionality described herein. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a medium such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various embodiments of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer-implemented method comprising:

receiving, at a first computing device, first location information of a second computing device and second location information of a third computing device, in response to an action performed with one or both of the second computing device and the third computing device;

determining whether one or more of the first location information and the second location information are stale based on one or more of whether a predetermined amount of time has passed since a fist time associated with the first location information and whether the predetermined amount of time has passed since a second time associated with the second location information;

when neither the first location information nor the second location information is determined to be stale, identifying, at the first computing device, whether the third computing device is within a pre-defined distance from the second computing device based on the received first location information and the received second location information;

when one or more of the first location information and second location information are determined to be stale, requesting, at the first computing device, updated location information for a computing device associated with location information determined to be stale;

when one or more of the first location information and second location information are determined to be stale and the requested updated location information is available, identifying, at the first computing device, whether the third computing device is within the pre-defined distance from the second computing device based on the updated location information;

when one or more of the first location information and second location information are determined to be stale and the requested updated information is unavailable, identifying, at the first computing device, whether the third computing device is within the pre-defined distance from the second computing device based on the received first and second location information; and sending, from the first computing device to the second computing device, automatically-suggested user information associated with the third computing device, when the third computing device is determined to be within the pre-defined distance from the second computing device.

2. The computer-implemented method of claim 1 wherein the action performed includes an application opening on the second computing device and the third computing device.

3. The computer-implemented method of claim 1 wherein the action performed includes the second computing device moving relative to the third computing device.

4. The computer-implemented method of claim 1 wherein sending the automatically-suggested user information includes sending to the second computing device a distance of the third computing device relative to the second computing device.

5. The computer-implemented method of claim 1 wherein sending the automatically-suggested user information includes organizing, by one or more of the first computing device and the second computing device, the automatically-suggested user information associated with the third computing device and automatically suggested user information associated with a fourth computing device based on a first distance of the third computing device from the second computing device relative to a second distance of the fourth computing device from the second computing device.

6. The computer-implemented method of claim 1 wherein the first location information of the second computing device and the second location information of the third computing device received, by the first computing device, in response to the action are updated after a pre-determined time interval.

7. The computer-implemented method of claim 1 wherein receiving the first and second location information includes requesting, by the first computing device, a most recent place of interest within the pre-defined distance of one or more of the second computing device and the third computing device.

8. A computer program product comprising a non-transitory computer usable medium including a computer readable program, wherein the computer readable program when executed on a computer cause the computer to:

receive first location information of a second computing device and second location information of a third computing device, in response to an action performed with one or both of the second computing device and the third computing device;

determine whether one or more of the first location information and the second location information are stale based on one or more of whether a predetermined amount of time has passed since a fist time associated with the first location information and whether the predetermined amount of time has passed since a second time associated with the second location information;

when neither the first location information nor the second location information is determined to be stale, identify whether the third computing device is within a pre-defined distance from the second computing device based on the received first location information and the received second location information;

when one or more of the first location information and second location information are determined to be stale, request updated location information for a computing device associated with location information determined to be stale;

when one or more of the first location information and second location information are determined to be stale and the requested updated information is available, identify whether the third computing device is within the pre-defined distance from the second computing device based on the updated location information;

when one or more of the first location information and second location information are determined to be stale and the requested updated information is unavailable, identify whether the third computing device is within the pre-defined distance from the second computing device based on the received first and second location information; and send to the second computing device, automatically-suggested user information associated with the third computing device, when the third computing device is determined to be within the pre-defined distance from the second computing device.

9. The computer program product of claim 8 wherein the action performed includes an application opening on the second computing device and the third computing device.

10. The computer program product of claim 8 wherein the action performed includes the second computing device moving relative to the third computing device.

11. The computer program product of claim 8 wherein sending the automatically-suggested user information includes sending to the second computing device a distance of the third computing device relative to the second computing device.

12. The computer program product of claim 8 wherein sending the automatically-suggested user information includes organizing, by one or more of the computer and the second computing device, the automatically-suggested user information based on a first distance of the third computing device from the second computing device relative to a second distance of the fourth computing device to the second computing device.

13. The computer program product of claim 8 wherein the first location information of the second computing device and the second location information of the third computing device received, in response to the action are updated after a pre-determined time interval.

14. The computer program product of claim 8 wherein receiving the first and second location information includes requesting a most recent place of interest within the pre-defined distance of one or more of the second computing device and the third computing device.

15. A system comprising:

one or more processors; and one or more memories storing instructions that, when executed by the one or more processors, cause the system to:

receive first location information of a second computing device and second location information of a third computing device, in response to an action performed with one or both of the second computing device and the third computing device;

when neither the first location information nor the second location information is determined to be stale, identify whether the third computing device is within a pre-defined distance from the second computing device based on the received first location information and the received second location information;

when one or more of the first location information and second location information are determined to be stale, request updated location information for a computing device associated with location information determined to be stale;

when one or more of the first location information and second location information are determined to be stale and the requested updated information is available, identify whether the third computing device is within the pre-defined distance from the second computing device based on the updated location information;

when one or more of the first location information and second location information are determined to be stale and the requested updated information is unavailable, identify whether the third computing device is within the pre-defined distance from the second computing device based on the received first and second location information; and send to the second computing device, automatically-suggested user information associated with third computing device, when the third computing device is determined to be within the pre-defined distance from the second computing device.

16. The system of claim 15 wherein the action performed includes one or more of:

an application opening on at least the second computing device and the third computing device; and the second computing device moving relative to the third computing device.

17. The system of claim 15 wherein the automatically-suggested user information includes organizing the automatically-suggested user information associated with the third computing device and automatically suggested user information associated with a fourth computing device based on a first distance of the third user device from the second computing device relative to a second distance of the fourth computing device from the second computing device.

18. The system of claim 15 wherein the first location information of the second computing device and the second location information of the third computing device received in response to the action are updated after a pre-determined time interval.

19. The system of claim 15 wherein receiving the first and second location information includes receiving a request for a most recent place of interest within the pre-defined distance of one or more of the second computing device and the third computing device.

* * * * *